US012504877B2

(12) United States Patent
Lyu

(10) Patent No.: US 12,504,877 B2
(45) Date of Patent: Dec. 23, 2025

(54) DYNAMIC STORAGE TIERING BASED ON APPLICATION DEMANDS

(71) Applicant: International Business Machines Corporation, Armonk, NY (US)

(72) Inventor: Gang Lyu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 18/605,371

(22) Filed: Mar. 14, 2024

(65) Prior Publication Data

US 2025/0291479 A1    Sep. 18, 2025

(51) Int. Cl.
*G06F 3/06* (2006.01)
(52) U.S. Cl.
CPC .......... *G06F 3/0604* (2013.01); *G06F 3/0655* (2013.01); *G06F 3/0679* (2013.01)
(58) Field of Classification Search
CPC .............................. G06F 3/0604; G06F 3/0655
See application file for complete search history.

(56) References Cited

U.S. PATENT DOCUMENTS

| | | | |
|---|---|---|---|
| 7,421,402 | B2 | 9/2008 | Chang et al. |
| 8,285,959 | B2 | 10/2012 | Jess |
| 10,078,569 | B1 | 9/2018 | Alshawabkeh et al. |
| 10,146,469 | B2 | 12/2018 | Polkovnikov et al. |
| 2012/0102350 | A1 | 4/2012 | Belluomini et al. |
| 2017/0262216 | A1* | 9/2017 | Polkovnikov ......... G06F 3/0649 |
| 2017/0288982 | A1* | 10/2017 | Katsaros ................. H04L 67/02 |
| 2022/0210093 | A1* | 6/2022 | Kumar ................... H04L 47/828 |

OTHER PUBLICATIONS

Guerra et al., "Cost Effective Storage using Extent Based Dynamic Tiering," 9th USENIX Conference on File and Storage Technologies, Feb. 2011, pp. 1-14, retrieved from https://www.usenix.org/conference/fast11/cost-effective-storage-using-extent-based-dynamic-tiering.
Wu et al., "Ensuring Performance in Activity-Based File Relocation," Proceedings of the 26th IEEE International Performance Computing and Communications Conference, Apr. 2007, 11 pages.
IBM, "IBM Easy Tier," IBM Documentation, Jul. 7, 2023, 9 pages, retrieved from https://www.ibm.com/docs/en/ds8900/9.3.3?topic=features-easy-tier.

* cited by examiner

*Primary Examiner* — Nicholas A. Paperno
(74) *Attorney, Agent, or Firm* — Zilka-Kotab, P.C.

(57) ABSTRACT

A computer-implemented method (CIM), according to one embodiment, includes obtaining application data associated with interaction of applications of host servers that use a data storage system and using the application data to predict performance requirements for the applications with respect to the data storage system. The method further includes maintaining a persistent control repository having parameter fields. A first and second of the parameter fields detail, for extents of data stored in tiers of the data storage system, associated ranges of acceptable performance targets, and a third and fourth of the fields detail, associated arrival times for requests from the applications for the extents of data. The method further includes using the persistent control repository to calculate heat weights for the extents of data, and causing a tiering manager to adjust a current tiering of the extents of data in the tiers based on the calculated weights.

19 Claims, 11 Drawing Sheets

| Extent group ID | Accepted performance target | Accepted request target | Maximum rival performance target | Maximum rival request time | Request interval threshold | Missing interval threshold | Need handle? |
|---|---|---|---|---|---|---|---|
| Extent group ID 1 | 0.5ms | 06:12:38 | 1.0ms | 06:28:27 | 6 | 4 | No |
| Extent group ID 2 | 0.5ms | 06:12:38 | 1.0ms | 06:28:27 | 6 | 4 | No |
| Extent group ID 3 | 1.5ms | 07:09:52 | 1.0ms | 08:32:50 | 5 | 5 | Yes |
| Extent group ID 4 | 3.0ms | 07:30:29 | 2.0ms | 09:26:25 | 8 | 6 | Yes |

FIG. 6

DYNAMIC STORAGE TIERING BASED ON APPLICATION DEMANDS

BACKGROUND

The present invention relates to data storage systems, and more specifically, this invention relates to tiered data storage systems.

Storage tiering technology is to place frequently accessed data in a relatively faster tier of storage, which is also sometimes referred to as a relatively "higher" tier of storage. Meanwhile relatively less accessed data is placed in a relatively slower tier of storage, which is also sometimes referred to as a relatively "lower" tier of storage.

SUMMARY

A computer-implemented method (CIM), according to one embodiment, includes obtaining application data associated with interaction of applications of host servers that use a data storage system and using the application data to predict performance requirements for the applications with respect to the data storage system. The method further includes maintaining a persistent control repository that includes parameter fields. A first and second of the parameter fields detail, for extents of data stored in tiers of the data storage system and used by the applications, associated ranges of acceptable performance targets, and a third and fourth of the parameter fields detail, associated arrival times for requests from the applications for the extents of data. The method further includes using the persistent control repository to calculate heat weights for the extents of data, and causing a tiering manager of the data storage system to adjust a current tiering of at least some of the extents of data in the tiers based on the calculated heat weights.

A computer program product (CPP), according to another embodiment, includes a set of one or more computer-readable storage media, and program instructions, collectively stored in the set of one or more storage media, for causing a processor set to perform the foregoing method.

A computer system (CS), according to another embodiment, includes a processor set, a set of one or more computer-readable storage media, and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6 is a depiction of a persistent control repository, in accordance with one embodiment of the present invention.

DETAILED DESCRIPTION

Figure 1:
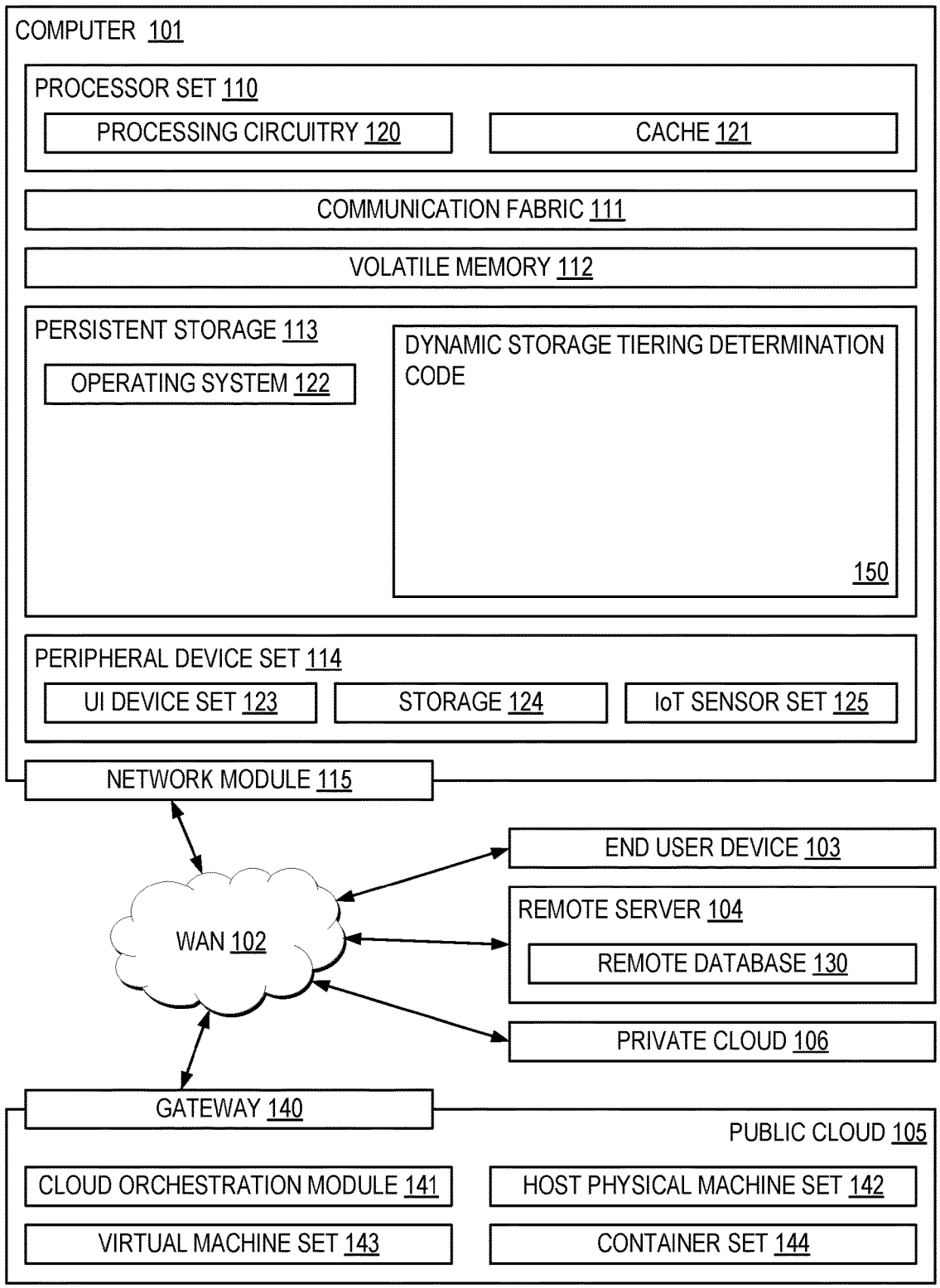
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing dynamic storage tiering based on application demands.

In one general embodiment, a CIM includes obtaining application data associated with interaction of applications of host servers that use a data storage system and using the application data to predict performance requirements for the applications with respect to the data storage system. The method further includes maintaining a persistent control repository that includes parameter fields. A first and second of the parameter fields detail, for extents of data stored in tiers of the data storage system and used by the applications, associated ranges of acceptable performance targets, and a third and fourth of the parameter fields detail, associated arrival times for requests from the applications for the extents of data. The method further includes using the persistent control repository to calculate heat weights for the extents of data, and causing a tiering manager of the data storage system to adjust a current tiering of at least some of the extents of data in the tiers based on the calculated heat weights.

In another general embodiment, a CPP includes a set of one or more computer-readable storage media, and program instructions, collectively stored in the set of one or more storage media, for causing a processor set to perform the foregoing method.

In another general embodiment, a CS includes a processor set, a set of one or more computer-readable storage media, and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as dynamic storage tiering determination code of block 150 for performing dynamic storage tiering based on application demands. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

Figure 2:
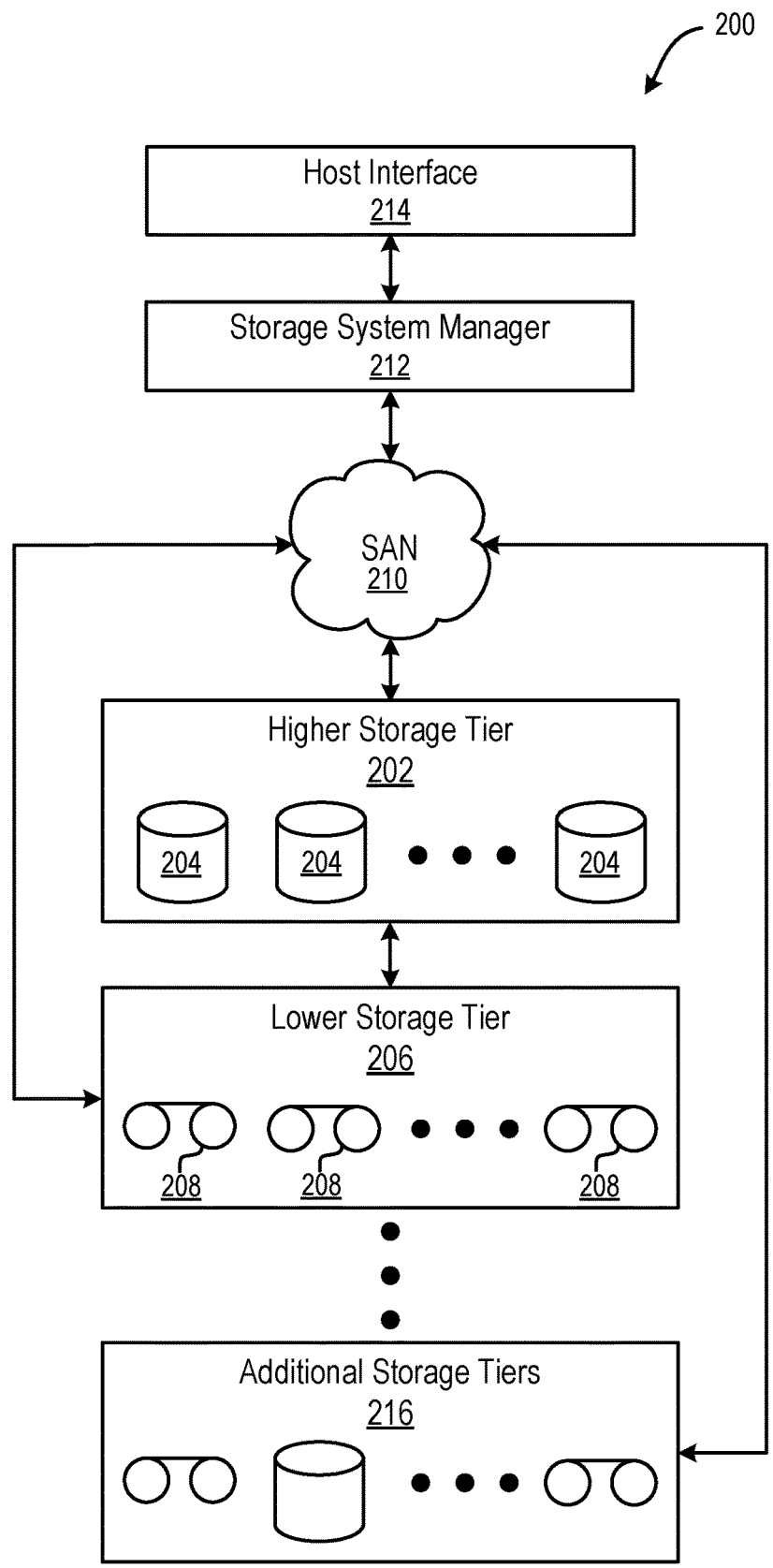
FIG. 2 is a diagram of a tiered data storage system, in accordance with one embodiment of the present invention.

Now referring to FIG. 2, a storage system 200 is shown according to one embodiment. Note that some of the elements shown in FIG. 2 may be implemented as hardware and/or software, according to various embodiments. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a SAN, as shown in FIG. 2, Internet Protocol (IP) network, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

As mentioned elsewhere above, storage tiering technology is to place frequently accessed data in a relatively faster tier of storage, which is also sometimes referred to as a relatively "higher" tier of storage. Meanwhile relatively less accessed data is placed in a relatively slower tier of storage, which is also sometimes referred to as a relatively "lower" tier of storage.

Performance requirements of applications on hosts within a data storage system are typically absolute values instead of placing the data into specific tiers on a storage backend. For example, an application may have a performance requirement of a read latency to be less than 1 millisecond (ms), however, the application will not be able to determine which storage tier the data should be placed in in order to achieve this performance. These performance requirements may also be defined in service level agreement (SLAs) and/or a quality of service (QoS). Performance inefficiencies exist within tiered data storage systems. Conventional application performance requirements create inefficiencies in tiered data storage systems. For example, relatively faster tier overloading occurs based on data being stored by several applications that specify the same storage tier. The requests of the host applications may conflict with one another owing to the limited space of the fast tier. Furthermore, insufficient requests occur when data placement requests do not meet actual application requirements. Yet furthermore, in over-satisfaction, a provided performance may relatively highly exceed application requirements with data in a faster tier. This ultimately wastes the capabilities of the fast tier. With the configuration of a memory cache in a storage server and the adoption of the write back mechanism, and if no extreme overdrive occurs, the performance of a host side is mainly determined by the missing reads on the storage server. For example, the average response time is typically impacted by the read cache hit ratio and response time of the backend stage operations. Accordingly, missing reads are used as an illustrative example in order to explain the techniques of embodiments and approaches described herein.

In order to mitigate the inefficiencies described above, the techniques described in embodiments and approaches described herein orchestrate performance requirements from different applications of different hosts within a data storage system and place the data in tiers determined to provide a performance closest to what applications require. This avoid instances of over-occupying fast tiers as well as resource conflicts that would otherwise occur based on too many requests being directed to the same tier. Furthermore, these techniques generate predicted performance requirements for the applications according to priority, historical statistics, component interaction, user feedback, etc. Rival application performance requirements are also handled, while calculating the corresponding storage backend performance targets, setting a gap between the actual values and targets as a new dimension to dynamically adjust tiers bidirectionally combining with data heat. Finally, the space allocation of storage tiers is balanced between the application performance requirements and data heat with a feedback mechanism using the techniques described herein.

A list of terms used in the description and their definitions with respect to a control repository described herein, is provided below.

extent_group_ID: The identification (ID) of an extent group containing a fixed number of extents for a volume. An example is volume_ID:extent_group_ID.

accepted_performance_target: The performance requirement of an accepted request.

accepted_request_time: An arrival time of the accepted performance request.

maximum_rival_performance_target: The maximum performance requirement of rival requests.

maximum_rival_requestLtime: An arrival time of the maximum performance requirement of rival requests.

request_interval_threshold: Host needs to send requests for heartbeat in every request_interval_threshold. For example, request_interval_threshold=6 hours.

missing_interval_threshold: The count of continuous request_interval_threshold intervals with missing requests before resetting heat_weight to 0. For example, missing_interval_threshold=4.

need_handle: A flag that is set and unset depending on a determination to indicate whether an entry needs to be handled by a backend request controller.

A list of terms used in the description and their definitions with respect to a persistent control repository (which may be also referred to herein as a "tiering technology repository") described herein, is provided below.

heat_weight: A heat_weight of every extent is stored in persistent storage of tiering technology module.

heat_weight_adjustment: An adjustment of a calculated value of heat_weight. This is used to balance the space allocation of tiers between the application requirement and data heat, and can be changed with feedback.

performance downgrade request An application request to downgrade the performance requirements of a specified extent group of data. For example, assuming that a previous request is the response time of 0.5 ms and a current request is the response time of 1 ms, the current request is a performance downgrade request.

performance upgrade request An application request to upgrade the performance requirements of a specified extent group of data. For example, assuming that a previous request is the response time of 1 ms and a current request is the response time of 0.5 ms, the current request is a performance upgrade request.

Figure 3:
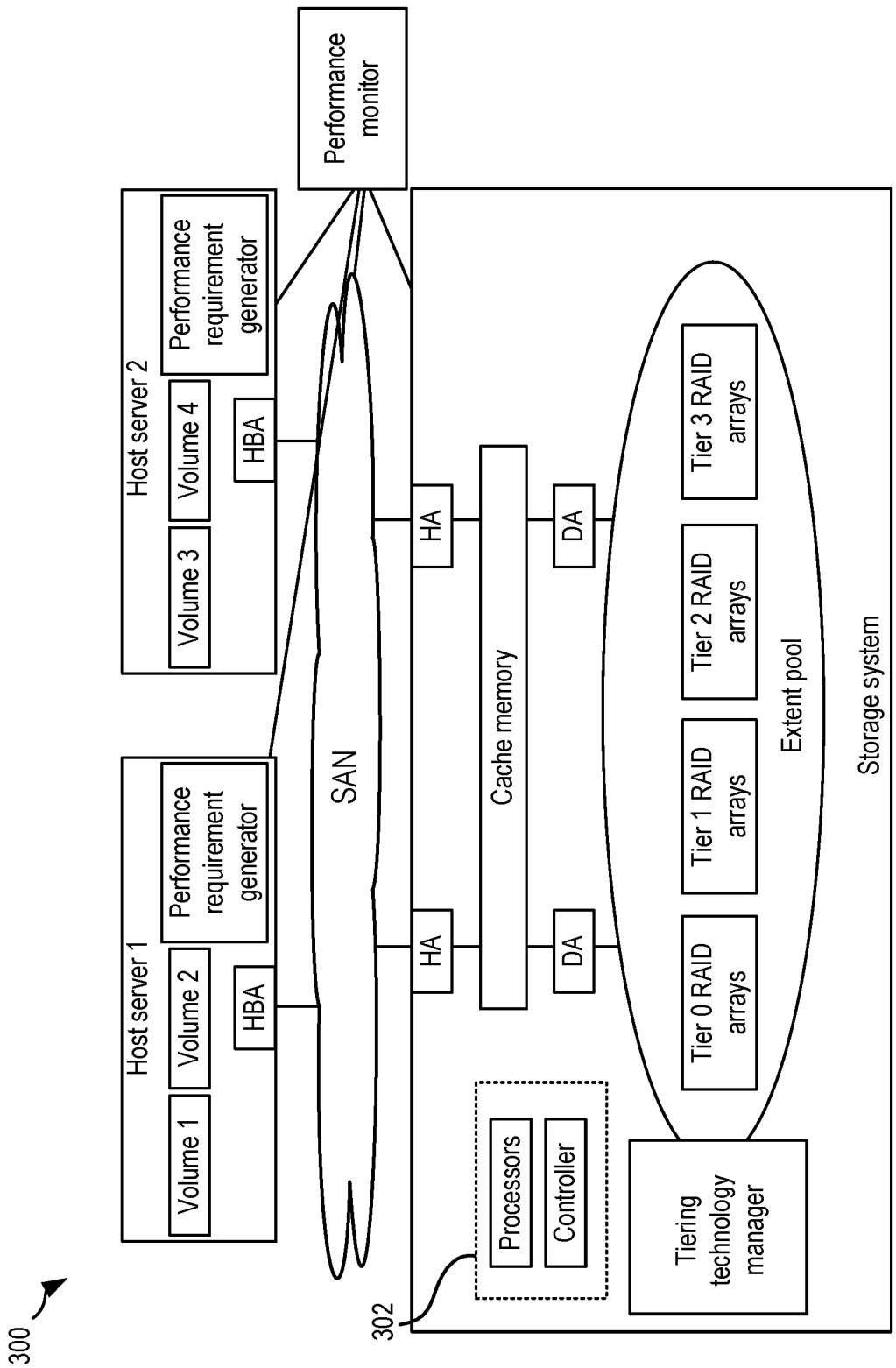
FIG. 3 is a diagram of an environment architecture, in accordance with one embodiment of the present invention.

FIG. 3 depicts an environment 300, in accordance with one embodiment. As an option, the present environment 300 may be implemented in conjunction with features from any other embodiment listed herein, such as those described with reference to the other FIGS. Of course, however, such environment 300 and others presented herein may be used in various applications and/or in permutations which may or may not be specifically described in the illustrative embodiments listed herein. Further, the environment 300 presented herein may be used in any desired environment.

The environment 300 includes a plurality of host servers, e.g., see Host server 1 and Host server 2. Although only two host servers are shown in the environment 300, in some other approaches, the system may include any number of host servers, e.g., one, three, ten, etc. The host servers include volumes of data, e.g., see Volume 1, Volume 2, Volume 3, and Volume 4, that they may store on a storage system, e.g., see Storage system. To enable this storage to the storage system, the host servers may communicate with the storage system via a SAN, e.g., via host bus adapters (see HBA) of the host servers and host adapters (see HA) of the storage system. On the storage system, all extents of data are stored in tiers of the data storage system, e.g., see Tier 0 Redundant Array of Independent Disks (RAID) arrays, Tier 1 RAID arrays, Tier 2 RAID arrays, and Tier 3 RAID arrays of an extent pool. Meanwhile, cache memory is used as a buffer for read commands and write commands.

The storage system also includes processors, and device adapter (see DA) between the cache memory and the extent pool. Various approaches below describe operations that may be performed in order to determine how to tier extents of data in a way that the space allocation of storage tiers is balanced between the application performance requirements and data heat with a feedback mechanism. These operations may, in some approaches, be performed by a component, e.g., such as a system device, that is external to the storage system. Meanwhile, a performance monitor is used to acquire the actual performance data of the system. Example of such a performance monitor include storage insight, etc. In some other approaches, these operations may be performed by a component of the storage system itself. It should be noted that various operations below are described to be performed by a processor of the storage system, which may be configured to use a controller of the storage system, e.g., see grouping 302 which may be a logical and/or physical grouping where the controller is some software components, including: a host request manager, backend request controller, SLA or QoS correspondence table, control repository, etc. In some approaches, the component that performs these operations is preferably configured to receive information from performance requirement generators of the host servers, and is further configured to instruct a tiering component, e.g., such as Tiering technology manager which may be a tiering manager, or perform tiering adjustments within the extent pool.

Some operations performed within the environment 300 include initializing the system. This initialization may, in some approaches, include launch daemons and tasks of the performance requirement generators, host request manager, backend request controller, tiering technology manager, performance monitor, timer daemon etc. A timer daemon, which will be described in further detail elsewhere herein, may also be initiated to periodically check whether any request has expired. Avoiding processing of these requests reduces a computational load of the processor performing the operations described herein.

The processor obtains application data associated with interaction of a plurality of applications, systems and components of the host servers that use the data storage system. The application data may, depending on the approach, include one or more of priority information, historical statistics, interaction of components of the host servers, user feedback, etc., although this is only an illustrative list of types of application data. For example, the application data may additionally and/or alternatively include a type of application data that would become apparent to one of ordinary skill in the art after reading the descriptions herein.

In order to obtain the application data, in some approaches, performance requirement generators of the host servers may ongoingly record the application data during use of the applications, and relay the application data to the processor via a performance monitor (module), which may be a portion of the processor component that is performing the operations described herein, that is configured to gather the application data. For context, one or more of these performance requirement generators, may be component(s), daemon(s) or program(s) running on the host servers to generate the requirement of the performance for the host applications. Each performance requirement generator acquires the historical performance data from the performance monitor component, storage insight, resource management information, etc. They also may be configured to acquire the information of the interaction among applications, systems and components in the host servers, as well as acquires the information of the feedback from users for applications in the host servers. The performance requirement generator, in some approaches, takes account of the parameters specified by users, like priorities of the applications, and predict the performance requirements for the applications according to the collected information.

The application data may be obtained in order to determine performance requirements of the applications. Note that these performance requirements may, in some approaches, be determined by the performance requirement generators and/or by the processor. For example, in some approaches, at least some of the application data may be used to predict performance requirements (also referred to herein as "application demands") for the applications with respect to the data storage system. Some examples of these performance requirements may include, e.g., maximum time for fulfilling a request for extents of data stored in tiers of the data storage system, a total amount of storage potential on a specified tier, temporal data storage times with less than a specified amount of latency, etc.

Techniques for predicting performance requirements of the applications, in some approaches, include prediction algorithms, such as exponential moving average, seasonal autoregressive integrated moving average, etc., which may be used to generate performance requirement predictions. Artificial intelligence (AI), such as neural network, may additionally and/or alternatively be used to generate the performance requirement prediction.

In some illustrative approaches, in cases in which an expected target of the performance indicators for an application are not designated by users, the performance requirement generator in each host server collects the historical performance statistics, component interaction, user feedback, etc. And it generates predicted performance requirements using prediction algorithms. Accordingly, in some approaches, the performance requirements are already predicted upon being received. In contrast, in some other cases in which the expected target of the performance indicators for an application are designated by users, the performance requirement generator sends the expected target of the performance indicator for volumes, files, datasets, tracks, etc., to a host request manager of the storage system (which may be managed and/or a portion of a component performing operations described herein). A target of average host read response time (host_read_response_time_target) is one example. Here, in some approaches, the host request manager translates the performance requests of SLA or QoS into the absolute value according to the SLA or a QoS correspondence table. If the requests are already in absolute value, no translation is needed.

The performance monitor module, in some approaches, continues to detect and record the actual value of the performance indicator on the host and calculate the average value for a period of time (also referred to herein as an "average performance of the data storage system" which may be calculated with respect to one or more of the extents of data stored on the storage system), such as actual average host read response time (actual_host_read_response_time_value). And then, in some approaches, the performance monitor sends the actual value of performance indicator to the processor which may inform the host request manager.

The host request manager may be configured to translate the associated host addresses, such as volume numbers, track IDs and host logical block addresses (LBAs), into backend addresses, such as extent numbers, RAID array numbers and backend LBAs, according to a volume mapping table.

With continued reference to the initialization of the system mentioned elsewhere above, in some approaches, the initialization includes building a persistent control repository, e.g., such as by setting values of the parameters of the persistent control repository. More specifically, this step may include building and maintaining a persistent control repository that includes parameter fields. In some approaches, a first and second of the parameter fields detail, for extents of data stored in tiers of the data storage system (e.g., which may be indicated by extent_group_IDs in the persistent control repository) and used by the applications, associated ranges of acceptable performance targets, e.g., accepted_performance_target and maximum_rival_performance_target. Furthermore, a third and fourth of the parameter fields may detail associated arrival times for requests from the applications for the extents of data, e.g., accepted_request_time and maximum_rival_request_time. These requests may include performance upgrade requests and performance downgrade requests of the corresponding applications that are sent to the storage server to be fulfilled, as will be described in further detail elsewhere herein. A fifth of the parameter fields may detail missing request interval thresholds for the extents of data, e.g., missing_interval_threshold, where the missing request interval thresholds define a number of times that associated request interval thresholds, e.g., request_interval_threshold, can be exceeded for the extents of data. Furthermore, the request interval thresholds define when requests for heartbeats are to be sent by the host servers. A sixth of the parameter fields specifies a need_handle value, e.g., true which indicates a flag being set or false which indicates the flag being unset (the need_handle flag which may be set to true or false). For context, the such a flag may be set and unset depending on a determination to indicate whether an entry needs to be handled by a backend request controller.

The initialization of the process may additionally and/or alternatively include initiating the heat_weight of every extent of data to a weight of zero, e.g., a null value, in the persistent control repository. The use of such weights is described in further detail elsewhere herein.

The host request manager may check the history of requests to the associated addresses (for the extents of data) in the persistent control repository and update the persistent control repository accordingly (handling conflict requests). Various techniques for evaluating requests for extents of data and maintaining, e.g., updating, the persistent control repository accordingly, are described below.

Requests may be received by the processor from the host servers for extents of data. For example a first request for a first of the extents of the data (Extent group ID 1) may be received. In response to a determination that the first request is a first request (a first request for the first extent of data since generating the persistent control repository) a determination may be made as to whether an actual average value meets a target. For context, the actual average value characterizes an average performance of the data storage system using the first extent of data over a predetermined period of time resulting from a current tiering of the extents of data in the tiers of the data storage system. Furthermore, the target is a performance target specified in the first request. In response to a determination that the actual average value meets the target, e.g., the request is able to be fulfilled in less than or equal to a performance target time threshold, the persistent control repository is updated and a first flag is unset (the need_handle for the first extent of data is set to false). In other words, based on the flag being unset, an indication is stored that the tiering of the first extent of data in the tiers of storage system does not need to be adjusted (at least for the time being). The update performed to the persistent control repository may include setting an accepted performance target of the first extent of data in the persistent control repository to the performance target of the first request and setting an accepted request time in the persistent control repository to a time that the first request is received. In contrast, in response to a determination that the first request is the first request and the actual average value does not meet the target, e.g., the request is not able to be fulfilled in less than or equal to a performance target time threshold, the persistent control repository is still updated using the techniques described above, but the first flag is set (the need_handle for the first extent of data is set to true) to indicate that the tiering manager should update the current tiering with respect to the first extent of data in order to thereafter cause the actual average value to meet the target. In other words, in some approaches, the tiering manager is configured to adjust the current tiering of at least some of the extents of data in response to the first flag being set (the need_handle being set to true) and is configured to not adjust the current tiering in response to the first flag being not set, e.g., being unset, the need_handle being set to false.

In some approaches, another request may be received for the first extent of data, e.g., a second request, that is not a first request for the first extent of data. In some approaches, the second request is a performance upgrade request for the first extents of data. Information in one or more of the parameter fields of the persistent control repository may, in some approaches, be used to evaluate the second request. For example, the range of acceptable performance targets associated with the second request may be defined by an accepted performance target of the first extent of data and a maximum performance target of the other application requests (also referred to herein as a "maximum rival performance target"), which may be parameter fields that may be used to evaluate the second request. For example, in order to maintain the persistent control repository, in response to receiving the second request from a first of the applications, a determination may be made as to whether a first value that is based on an average performance of the data storage system using the first extent of data meets a performance target of the second request, e.g., is less than or equal to the accepted performance target of the second request. In response to a first determination that the first value meets the performance target of the second request, in some preferred approaches, the first flag is unset (set need_handle to false), and at least some of the parameter fields of the persistent control repository (where the rows associated with the first extent of data) are updated as described below.

With respect to updating the persistent control repository, it should be noted that, in some approaches, a third parameter field of the persistent control repository may define arrival times of previous requests for the extents of data, and a fourth parameter field may define an arrival time of a rival request having a maximum relative performance target. More specifically, the arrival time of the rival request having the maximum relative performance target means that besides the accepted request, there are a plurality of other requests (rival requests) being received from the hosts. Among these rival request (except the accepted request), only one request which has the maximum performance target is recorded. Here, this terms refers to the arrival time of that recorded request. With this context in mind, updating at least some of the parameter fields of the persistent control repository in response to the first determination describe above may include setting the maximum request time of the other application requests for the first extent of data to the arrival time of the previous request for the first extent of data, setting the maximum performance target of the other application requests to the accepted performance target of the first extent of data, setting the arrival time of the previous request for the first extent of data to an arrival time of the first request, and setting the accepted performance target of the first extent of data to the performance target of the first request. In other words, with respect to the lists of terms described elsewhere above, such an updating of the parameter fields of the persistent control repository includes: setting the maximum_rival_request_time equal to the accepted_request_time, setting the maximum_rival_performance_target equal to the accepted_performance_target, setting the accepted_request_time to the arrival time of the second request, and setting the accepted_performance_target to the target of the second request.

In contrast to the determination made above, in some approaches, maintaining the persistent control repository includes, in response to a second determination that the first value does not meet the performance target of the first request setting the first flag (set need_handle to true), and updating at least some of the parameter fields of the persistent control repository. Updating of the parameter fields of the persistent control repository may include (for the rows associated with the first extent of data), setting the maximum_rival_request_time equal to the accepted_request_time, setting the maximum_rival_performance_target equal to the accepted_performance_target, setting the accepted_request_time equal to the arrival time of the new performance upgrade request, and setting the accepted_performance_target equal to the target of the new performance upgrade request.

In some approaches, another request may be received for the first extent of data, e.g., a third request, that is not a first request for the first extent of data. In some approaches, the third request is a performance downgrade request for the first extents of data. In response to a determination that the third request is a performance downgrade request, the first flag is unset (set need_handle to false), and the following fields are preferably updated in the persistent control repository: the maximum_rival_request_time is set to the arrival time of the new performance downgrade request and the maximum_rival_performance_target is set to the target of the new performance downgrade request.

A timer daemon of the processor performing the operations described herein, or alternatively under the instruction of the processor, sets a timer to track request_interval_threshold. A host request manager may expect to receive the requests as a heartbeat or new requests within the request_interval_threshold, including accepted request and maximum rival request. In response to a determination that no such request is received, the corresponding counters (request expiration management) are increased. For example, in some approaches, maintaining the persistent control repository may include determining the arrival time of one of a request, e.g., via timestamp information, and in response to a determination that the arrival time of the first request is greater than the missing request interval threshold for the first extent of data, removing all data in the persistent control repository associated with the first extent of data. Furthermore, in response to such a determination, the heat weight for the first extent of data is set to a null value, e.g., zero. In other words, in some approaches, in response to a determination that the counter exceeds missing_interval_threshold and the maximum_rival_request_time is NULL, the entry in persistent control repository that is requested is removed. Thereafter a next request to the same extent (e.g., the first extent of data) is treated as the first request, e.g., see descriptions elsewhere herein for processing a first request for an extent of data. The tiering technology manager of the storage system may optionally be notified that heat_weight of the associated addresses is changed to zero. Furthermore, in some approaches, in response to a determination that the counter exceeds missing_interval_threshold and the maximum_rival_request_time is not NULL (zero), the accepted_request_time is set to be equal to the maximum_rival_request_time, the accepted_performance_target is set to be equal to the maximum_rival_performance_target, and the need_handle is set to true (the first flag is set).

In some approaches the processor may act as a backend request controller, or alternatively instruct a backend request controller to scan the entries in the persistent control repository to find the requests to handle them periodically using the techniques described herein. A frequency in which the scanning is performed may be configured according to the configuration of the environment 300.

The performance monitor may continue to detect and record the associated actual value of the performance indicators, and calculate the average value for a period of time, such as actual average backend read response time (backend_read_response_time_value), SAN transmission time (SAN_transmission_time) and frontend handling time (frontend_handling_time). Note that the performance monitor may provide these calculations to the processor performing operations described herein, or in some other approaches, the processor may include the performance monitor. For example, the backend request controller, e.g., see controller, may in some approaches, acquire the performance data from performance monitor.

The backend request controller calculates the backend performance indicator target using one or more of the techniques described below. Calculation of the associated target of the performance indicator on the storage backend, such as the target of average read response time (backend_read_response_time_target), may be calculated as a difference between the host_read_response_time_target and a SAN_transmission_time and a frontend_handling_time, e.g., backend_read_response_time_target is equal to host_read_response_time_target−SAN_transmission_time−frontend_handling_time. In response to a determination that an actual value of the backend performance indicator meets the actual backend target, the need_handle is set to false (the first flag is unset).

In some preferred approaches, the processor uses the persistent control repository to calculate heat weights for the extents of data. For context and as will be described below, these weights may be updated over time based on predetermined factors, e.g., use of the extents of data, performance associated with use of the extents of data, etc. More specifically, a backend request controller may be instructed by the processor, or the processor may calculate the heat weights (heat_weight) for related extents and send the weights to the tiering technology manager. Heat weight is preferably positive for performance upgrade request and negative for performance downgrade request, and the need_handle may be set to false (first flag is unset) in response to adjustments of the weights.

In one or more of these approaches, each of the heat weights for the extents of data may be calculated using a formula based on the host servers use of the data storage system. The performance targets from the host are translated to the associated backend performance targets. Heat weight is then calculated using the backend performance targets and the actual backend performance indicators of those extents. In some approaches based on read commands, the formula includes: heat weight=(a backend read response time value−a host read response time target+a storage area network transmission time+a frontend handling time)/and the backend read response time value. In other words, the formula preferably details that heat_weight=(backend_read_response_time_value−host_read_response_time_target+SAN_transmission_time+frontend_handling_time)/backend_read_response_time_value.

The tiering manager of the data storage system is preferably caused, e.g., instructed by the processor, to adjust a current tiering of at least some of the extents of data in the tiers based on the calculated heat weights. This adjustment is performed to ensure that the acceptable performance targets are met. For example, the tiering technology manager may check whether the backend performance indicator can be improved. This may include checking the location of the extents of data associated to a request. In response to a determination that all of the extents of data have already been stored in a relatively fastest tier, the new heat weight of the requested extent of data is not updated to tiering technology repository, and instead, the request is requested.

These adjustments may furthermore be performed by checking the available space of the next tier where the extent is expected to be moved, e.g., a lower tier for a performance downgrade request and a higher tier for a performance upgrade request, and a ratio of the weighted extents to the unweighted extents. In response to a determination that all of the space of the next tier has been allocated to the weighted extents, the new heat weight of the extent of data is not updated to tiering technology repository, and instead, the request is rejected. In contrast, in response to a determination that the above checks pass, the backend request controller is notified that the request is accepted.

In some approaches, the tiering technology manager is instructed to update the new heat weights to the tiering technology repository and calculate the heat of extents of data according to the updated heat weights. Heat increases for the performance upgrade request and heat decreases for performance downgrade request. A preferred embodiment of calculation of the heat weights is as follows. Initially heat weights for an extent of data are set to a null value, e.g., heat_0=0. A tiering technology adjustment method is performed that includes using the formula heat_N+1=α*heat_N+(1−α)*average_value_N+1, where α is a predetermined value. In an application demand dynamic adjustment method, heat_N+1 is equal to heat_N*(1+ heat_weight_N*heat_weight_adjustment). This method may be applied to other prediction models of a type that would become apparent to one of ordinary skill in the art after reading the descriptions herein. The tiering technology manager may be instructed to starts the partition cycle immediately and handle the extent migration according to the new heat.

Various performance benefits are enabled as a result of deploying the techniques described herein. These benefits include integrated management of application performance optimization requests, as well as the enablement of dynamic adjustment if the weights of heat to avoid over-using a top tier of a tiered data storage system. Furthermore, these operations relatively improve the performance of the read and write workload, as well as relatively improve the total I/O performance of a data storage system.

Figure 4:
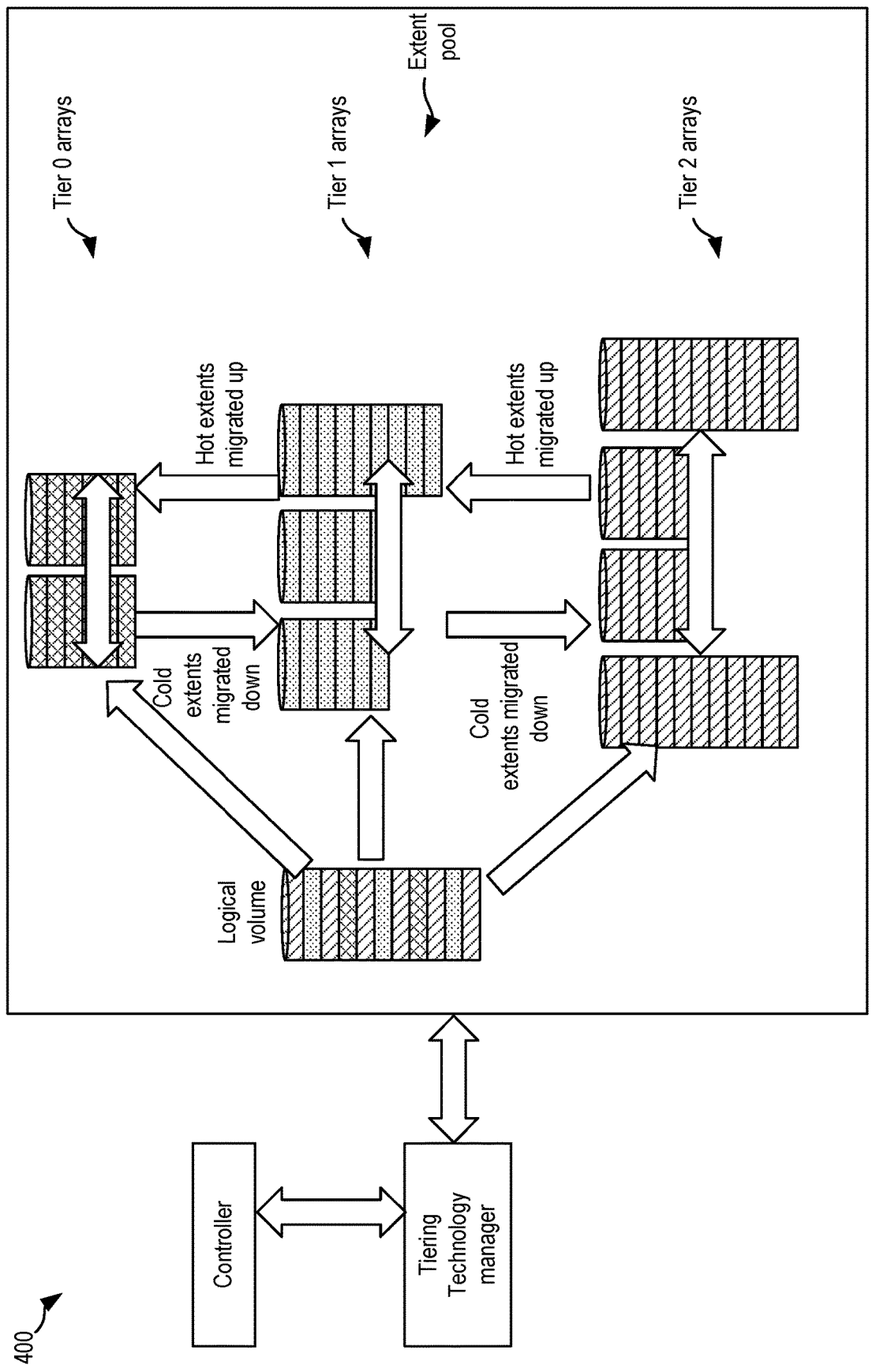
FIG. 4 is a diagram of an environment architecture, in accordance with one embodiment of the present invention.

FIG. 4 depicts an environment 400, in accordance with one embodiment. As an option, the present environment 400 may be implemented in conjunction with features from any other embodiment listed herein, such as those described with reference to the other FIGS. Of course, however, such environment 400 and others presented herein may be used in various applications and/or in permutations which may or may not be specifically described in the illustrative embodiments listed herein. Further, the environment 400 presented herein may be used in any desired environment.

The environment includes an extent pool that includes a plurality of tier arrays for storing extents of data, e.g., see Tier 0 Arrays, Tier 1 Arrays, and Tier 2 Arrays. Using the techniques described herein, a processor and/or controller may instruct a tiering technology manager such that hot extents of data, e.g., having relatively greater weights, are migrated to relatively faster tiers, e.g., see hot extents migrate up, and cold extents of data, e.g., having relatively lesser weights, are migrated to relatively slower tiers, e.g., see cold extents migrate down, in order to cause all tiers to dynamically rebalance based on workload. A logical volume may include extents of data from a plurality of the tiers.

Figure 5:
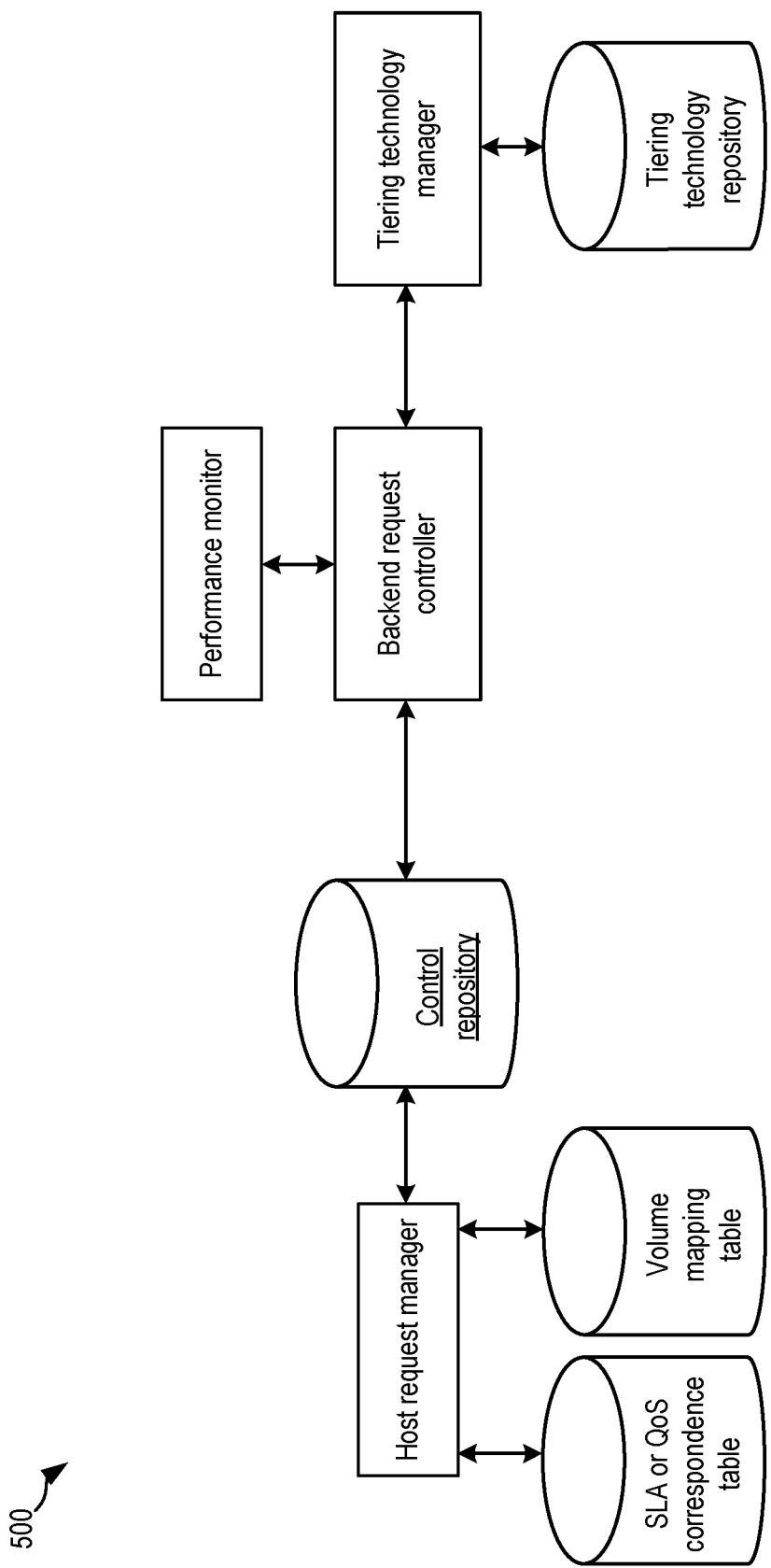
FIG. 5 is a diagram of an environment architecture, in accordance with one embodiment of the present invention.

FIG. 5 depicts an environment 500, in accordance with one embodiment. As an option, the present environment 500 may be implemented in conjunction with features from any other embodiment listed herein, such as those described with reference to the other FIGS. Of course, however, such environment 500 and others presented herein may be used in various applications and/or in permutations which may or may not be specifically described in the illustrative embodiments listed herein. Further, the environment 500 presented herein may be used in any desired environment.

The environment 500 includes a host request manager that has access to a volume mapping table and an SLA or QoS correspondence table, The host request manager may be configured to accept the performance change requests from a host, translate requests SLA and QoS two absolute values, handle conflict request from a conflict request manager and/or act as such a manager, and participate in handshake processes, e.g., heartbeat.

A persistent control repository of the environment 500 may include parameter fields with different types of information for different extents of data, e.g., extent_group_ID, accepted_performance_target, accepted_request_time, maximum_rival_performance_target, maximum_rival_request_time, missing count, request_interval_threshold, missing_interval_threshold, need_handle: true/false, etc. A backend request controller and performance monitor are configured to perform operations described elsewhere herein, e.g., see environment 300. A tiering technology manager of the environment is configured to adjust tiering of extents of data and information of a tiering technology repository based on heat weights.

FIG. 6 depicts a persistent control repository 600, in accordance with one embodiment. As an option, the present persistent control repository 600 may be implemented in conjunction with features from any other embodiment listed herein, such as those described with reference to the other FIGS. Of course, however, such persistent control repository 600 and others presented herein may be used in various applications and/or in permutations which may or may not be specifically described in the illustrative embodiments listed herein. Further, the persistent control repository 600 presented herein may be used in any desired environment.

The persistent control repository 600 includes a plurality of parameter fields that detail information associated with different extents of data that are identified according to extent group IDs, e.g., Extent group ID 1, Extent group ID 2, Extent group ID 3, and Extent group ID 4. The parameter fields may include, e.g., Extent group ID, Accepted performance target, Accepted request target, etc.

FIGS. 7A-7E illustrate method flowcharts that include operations that may be performed by the processor described in FIG. 3 and/or be performed by another component of an environment in response to receiving an instruction by such a processor.

Figure 7A:
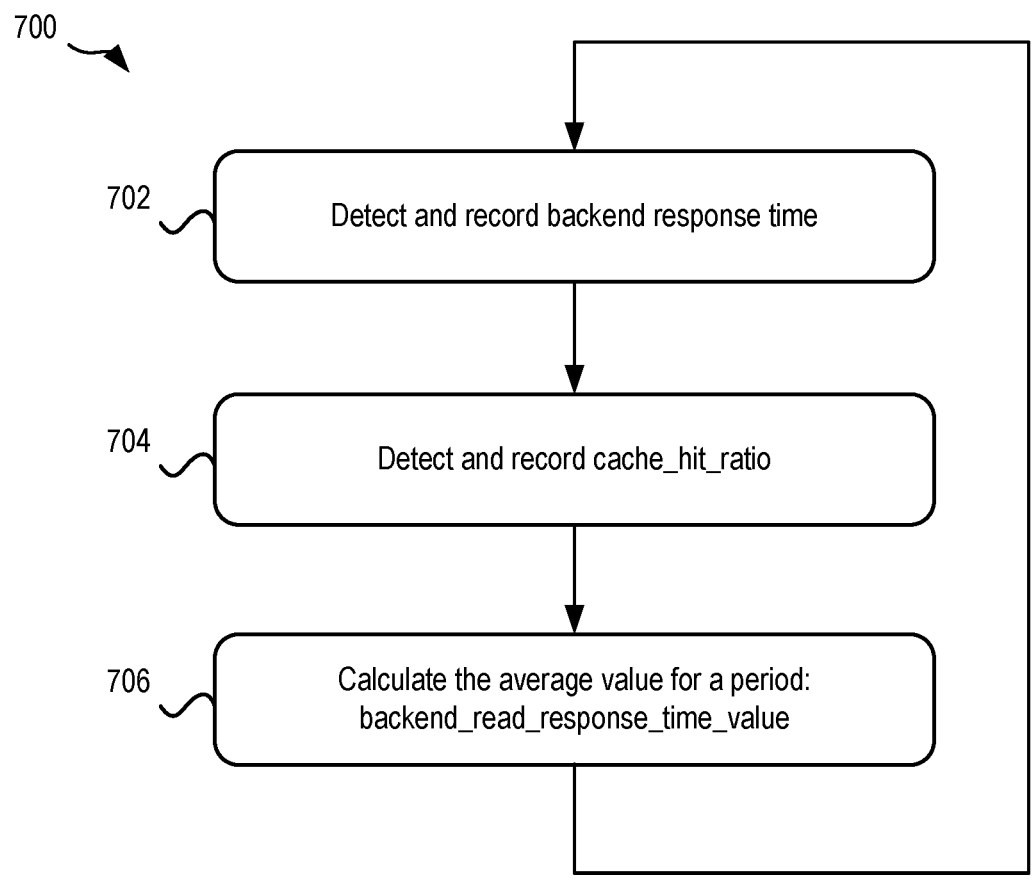
FIG. 7A is a flowchart of a method, in accordance with one embodiment of the present invention.

Now referring to FIG. 7A, a flowchart of a method 700 is shown according to one embodiment. The method 700 may be performed in accordance with the present invention in any of the environments depicted in FIGS. 1-7E, among others, in various embodiments. Of course, more or fewer operations than those specifically described in FIG. 7A may be included in method 700, as would be understood by one of skill in the art upon reading the present descriptions.

Each of the steps of the method 700 may be performed by any suitable component of the operating environment. For example, in various embodiments, the method 700 may be partially or entirely performed by a performance monitor, or some other device having one or more processors therein. The processor, e.g., processing circuit(s), chip(s), and/or module(s) implemented in hardware and/or software, and preferably having at least one hardware component, may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

Operation 702 includes detecting and recording a backend response time of a storage system.

Operation 704 includes detecting and recording a cache_hit_ratio.

Operation 706 includes calculating the average value for a period: backend_read_response_time_value.

Figure 7B:
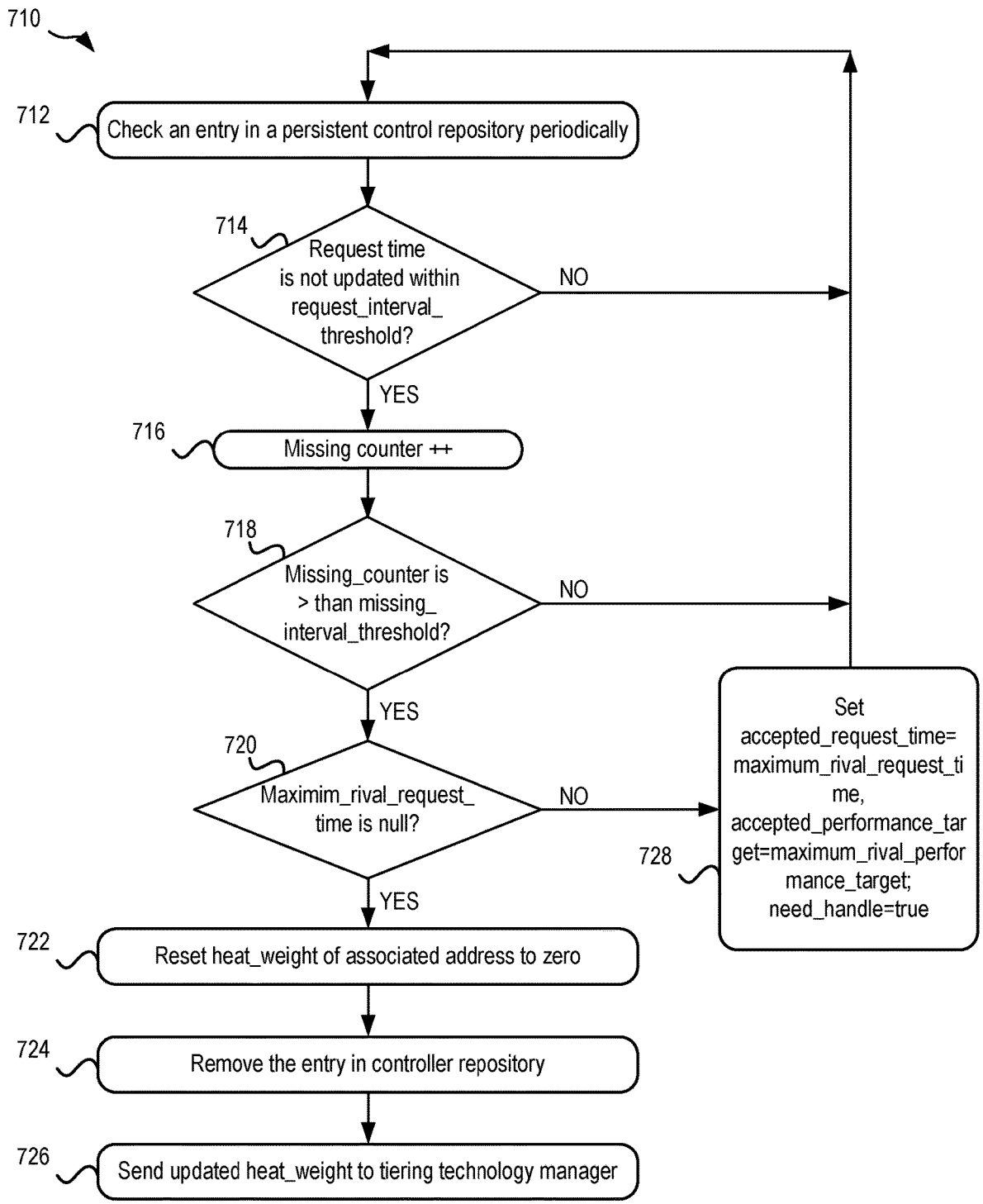
FIG. 7B is a flowchart of a method, in accordance with one embodiment of the present invention.

Now referring to FIG. 7B, a flowchart of a method 710 is shown according to one embodiment. The method 710 may be performed in accordance with the present invention in any of the environments depicted in FIGS. 1-7E, among others, in various embodiments. Of course, more or fewer operations than those specifically described in FIG. 7B may be included in method 710, as would be understood by one of skill in the art upon reading the present descriptions.

Each of the steps of the method 710 may be performed by any suitable component of the operating environment. For example, in various embodiments, the method 710 may be partially or entirely performed by a processor running a timer daemon, or some other device having one or more processors therein. The processor, e.g., processing circuit(s), chip(s), and/or module(s) implemented in hardware and/or software, and preferably having at least one hardware component, may be utilized in any device to perform one or more steps of the method 710. Illustrative processors include, but are not limited to, a central processing unit (CPU), an application specific integrated circuit (ASIC), a field programmable gate array (FPGA), etc., combinations thereof, or any other suitable computing device known in the art.

Operation 712 includes checking an entry in a persistent control repository periodically. A determination is made as to whether a request time is not updated within a request_interval_threshold, e.g., see decision 714. In response to a determination that the request time is updated within a request_interval_threshold, e.g., see "NO" of decision 714, the method returns to operation 712. In contrast, in response to a determination that the request time is not updated within a request_interval_threshold, e.g., see "YES" of decision 714, a missing counter is added to, e.g., see operation 716.

A determination is made as to whether the missing counter is greater than a missing_interval_threshold, e.g., see decision 718. In response to a determination that the missing counter is not greater than the missing_interval_threshold, e.g., see "NO" of decision 718, the method returns to operation 712. In contrast, in response to a determination that the missing counter is greater than the missing_interval_threshold, e.g., see "YES" of decision 718, the method continues to decision 720. Decision 720 includes determining whether a maximum rival request time is set to a null value. In response to a determination that the maximum rival request time is not set to a null value, e.g., see "NO" of decision 720, an accepted_request_time is set to a maximum_rival_request_time, an accepted_performance_target is set to a maximum_rival_performance_target, and a need_handle is set to true, e.g., see operation 728.

In contrast to the determination above, in response to a determination that the maximum rival request time is set to a null value, e.g., see "YES" of decision 720, the heat_weight of an associated address is reset to zero, e.g., see operation 722. Method 710 further includes removing the entry in controller repository, e.g., see operation 724, and sending the updated heat_weight to a tiering technology manager, e.g., see operation 726.

Figure 7C:
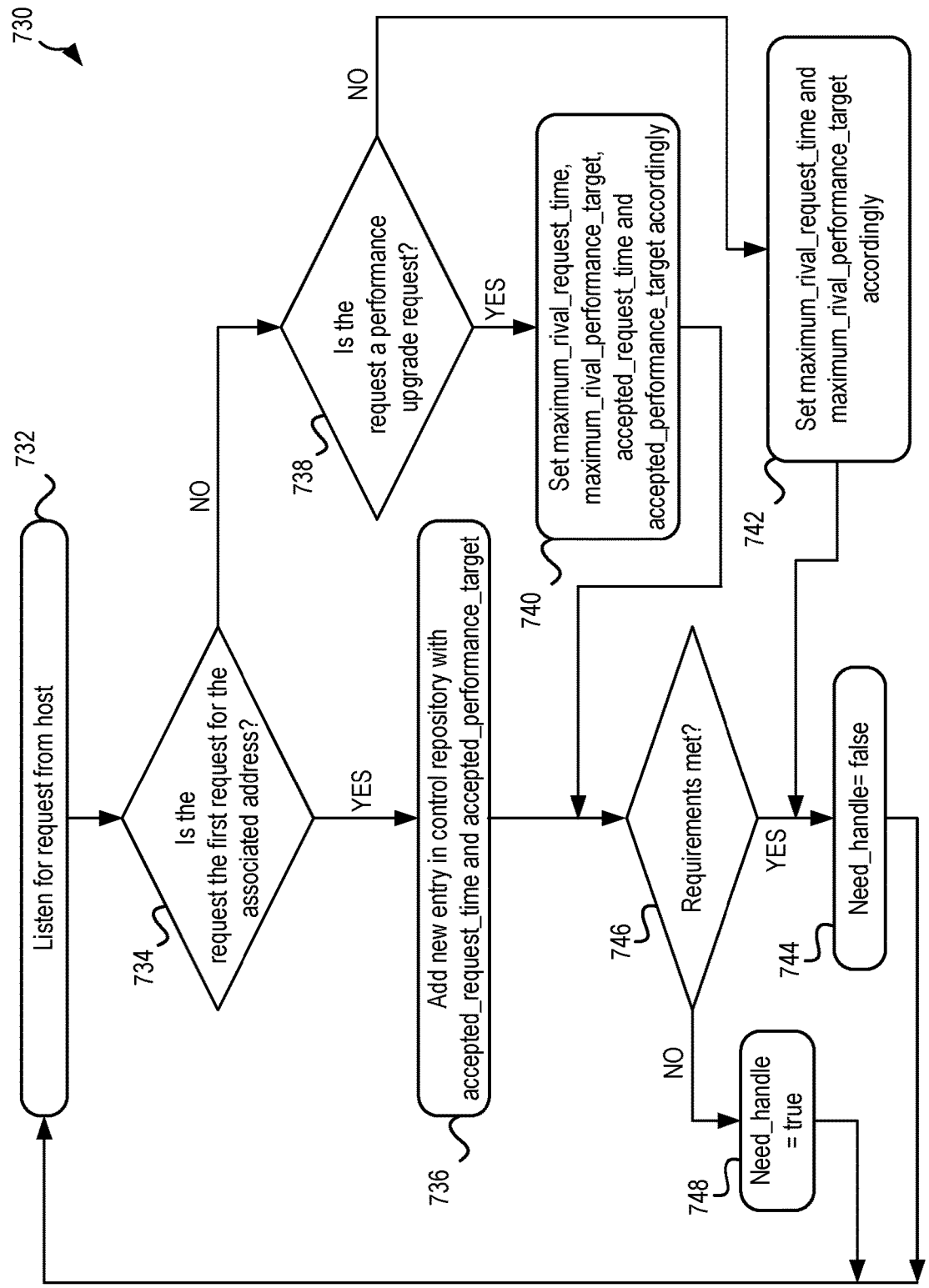
FIG. 7C is a flowchart of a method, in accordance with one embodiment of the present invention.

Now referring to FIG. 7C, a flowchart of a method 730 is shown according to one embodiment. The method 730 may be performed in accordance with the present invention in any of the environments depicted in FIGS. 1-7E, among others, in various embodiments. Of course, more or fewer operations than those specifically described in FIG. 7C may be included in method 730, as would be understood by one of skill in the art upon reading the present descriptions.

Each of the steps of the method 730 may be performed by any suitable component of the operating environment. For example, in various embodiments, the method 730 may be partially or entirely performed by a processor that acts as or instructs a host request manager, or some other device having one or more processors therein. The processor, e.g., processing circuit(s), chip(s), and/or module(s) implemented in hardware and/or software, and preferably having at least one hardware component, may be utilized in any device to perform one or more steps of the method 730. Illustrative processors include, but are not limited to, a central processing unit (CPU), an application specific integrated circuit (ASIC), a field programmable gate array (FPGA), etc., combinations thereof, or any other suitable computing device known in the art.

Operation 732 includes listening for a request from a host, e.g., for an extent of data. A determination is made as to whether a received request is the first request for an associated address, e.g., see decision 734. In response to a determination that the request is a first request, a new entry is added in a control repository with accepted_request_time and accepted_performance_target, e.g., see operation 736. For a contrary determination, a determination is made as to whether the request is a performance upgrade request, e.g., see decision 738. For performance upgrade requests, the maximum_rival_request_time, maximum_rival_performance_target, accepted_request_time and the accepted_performance_target are set using techniques described elsewhere herein, e.g., see operation 740. For non-performance upgrade requests, the maximum_rival_request_time and the maximum_rival_performance_target are set using techniques described elsewhere herein, e.g., see operation 742. Thereafter a need_handle parameter field for an extent of data associated with the request may be set to false, e.g., see operation 744.

Method 730 further includes determining whether predetermined requirements are met within the data storage system, e.g., see decision 746. These may include performance targets being met. In response to a determination that these requirements are met, the need_handle may be set to false, e.g., see operation 744. In contrast, in response to a determination that these requirements are not met, the need_handle may be set to true, e.g., see operation 748.

Figure 7D:
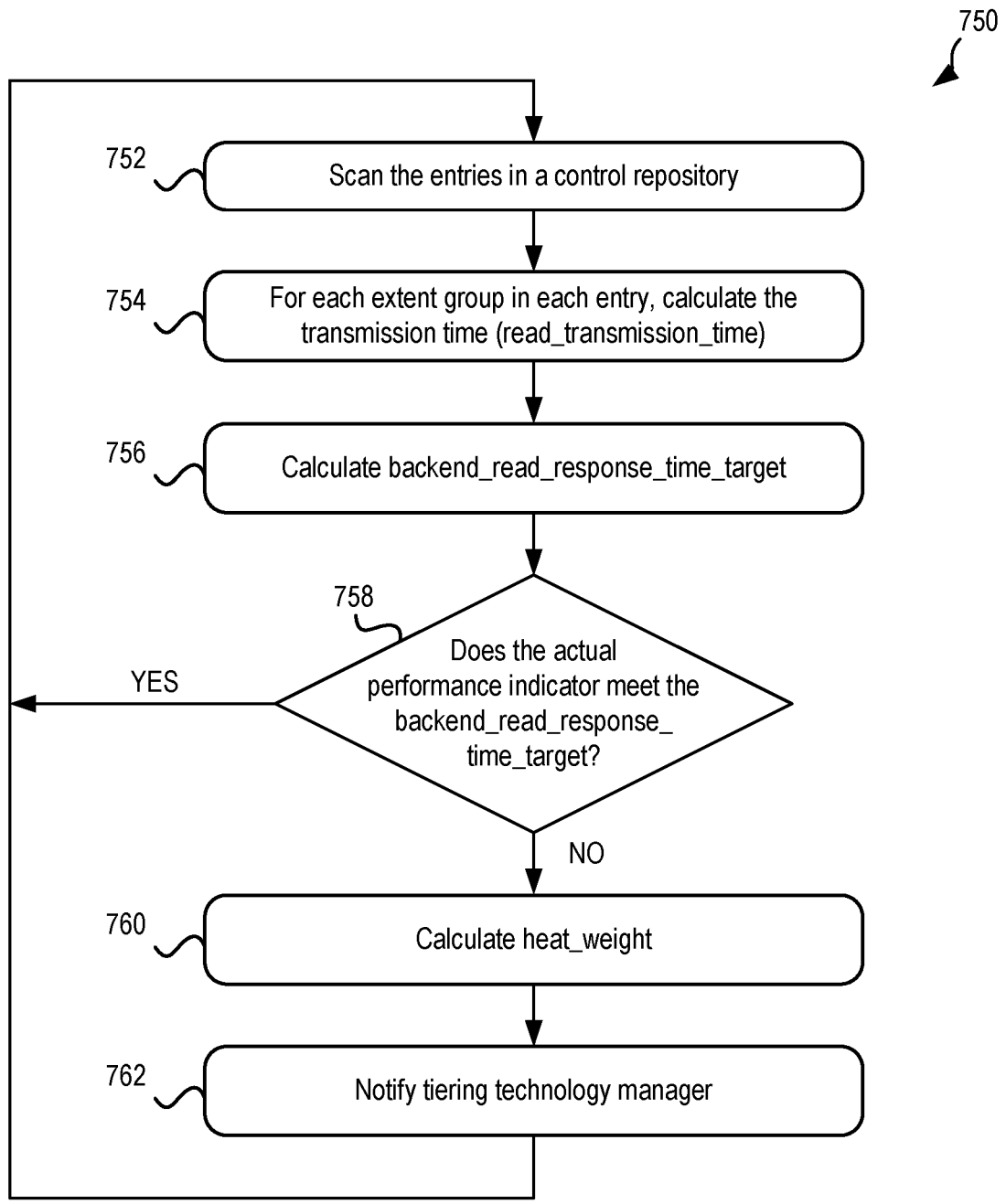
FIG. 7D is a flowchart of a method, in accordance with one embodiment of the present invention.

Now referring to FIG. 7D, a flowchart of a method 750 is shown according to one embodiment. The method 750 may be performed in accordance with the present invention in any of the environments depicted in FIGS. 1-7E, among others, in various embodiments. Of course, more or fewer operations than those specifically described in FIG. 7D may be included in method 750, as would be understood by one of skill in the art upon reading the present descriptions.

Each of the steps of the method 750 may be performed by any suitable component of the operating environment. For example, in various embodiments, the method 750 may be partially or entirely performed by a processor that acts as or instructs a backend request controller, or some other device having one or more processors therein. The processor, e.g., processing circuit(s), chip(s), and/or module(s) implemented in hardware and/or software, and preferably having at least one hardware component, may be utilized in any device to perform one or more steps of the method 750. Illustrative processors include, but are not limited to, a central processing unit (CPU), an application specific integrated circuit (ASIC), a field programmable gate array (FPGA), etc., combinations thereof, or any other suitable computing device known in the art.

Operation 752 includes scanning entries in a control repository. For each extent group in each entry a transmission time (read_transmission_time) is calculated, e.g., see operation 754. A backend_read_response_time_target may also be calculated, e.g., see operation 756. A determination is made as to whether the actual performance indicator meets the backend_read_response_time_target, e.g., see decision 758. In response to a determination that the indicator meets the backend_read_response_time_target, the method optionally returns to operation 752. In contrast, response to a determination that the indicator does not meet the backend_read_response_time_target, a heat_weight is calculated, e.g., see operation 760, and a tiering technology manager is notified, e.g., see operation 762.

Figure 7E:
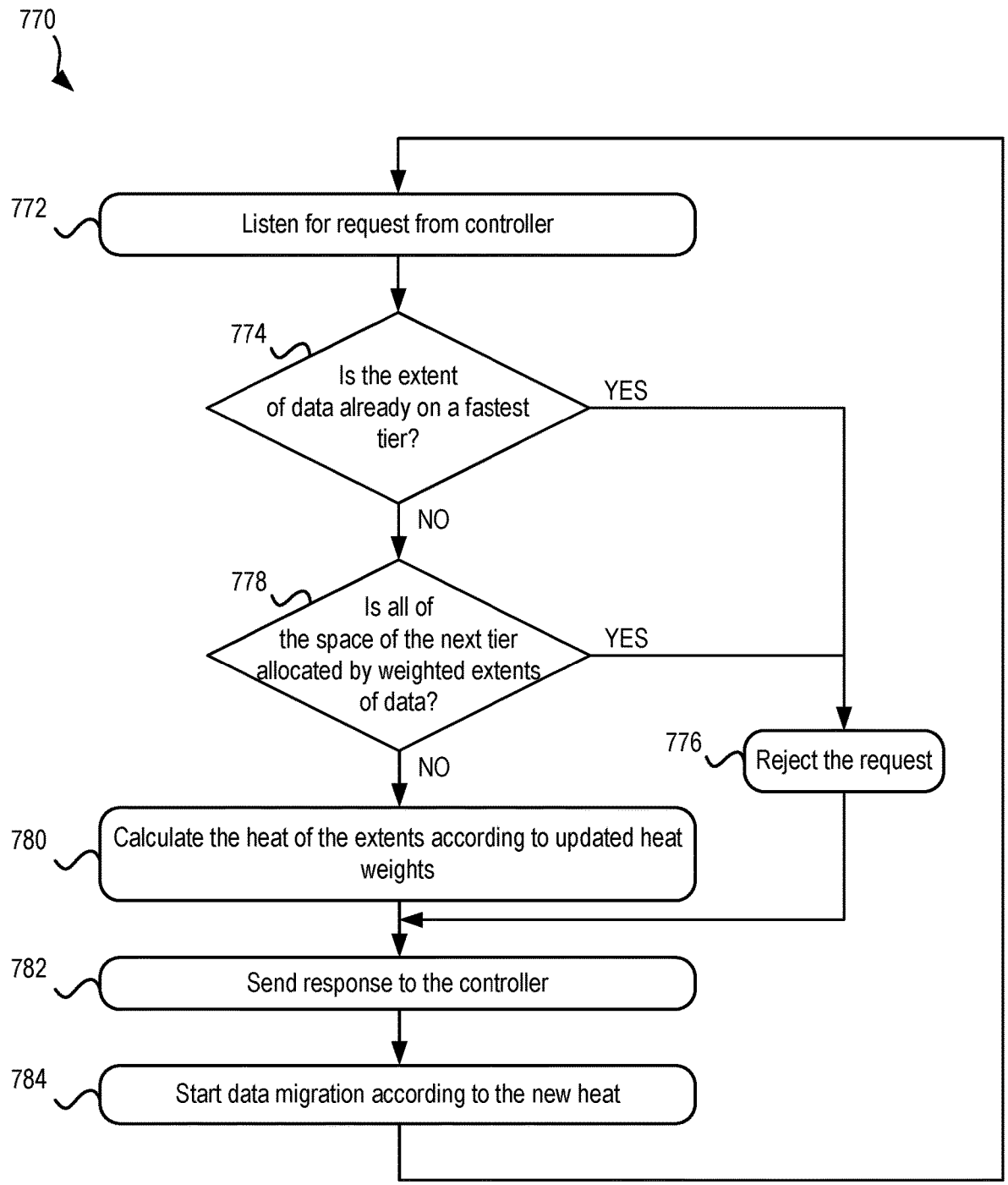
FIG. 7E is a flowchart of a method, in accordance with one embodiment of the present invention.

Now referring to FIG. 7E, a flowchart of a method 770 is shown according to one embodiment. The method 770 may be performed in accordance with the present invention in any of the environments depicted in FIGS. 1-7E, among others, in various embodiments. Of course, more or fewer operations than those specifically described in FIG. 7E may be included in method 770, as would be understood by one of skill in the art upon reading the present descriptions.

Each of the steps of the method 770 may be performed by any suitable component of the operating environment. For example, in various embodiments, the method 770 may be partially or entirely performed by a processor that acts as or instructs a tiering technology manager, or some other device having one or more processors therein. The processor, e.g., processing circuit(s), chip(s), and/or module(s) implemented in hardware and/or software, and preferably having at least one hardware component, may be utilized in any device to perform one or more steps of the method 770. Illustrative processors include, but are not limited to, a central processing unit (CPU), an application specific integrated circuit (ASIC), a field programmable gate array (FPGA), etc., combinations thereof, or any other suitable computing device known in the art.

Operation 772 includes listening for a request from a controller. A determination is made as to whether an extent of data requested in a received request is already on a fastest tier, e.g., see decision 774. In response to a determination that the extent of data is already on a fastest tier, the request, which may be a performance upgrade request is rejected, e.g., see operation 776. In contrast, in response to a determination that the extent of data is not already on a fastest tier, a determination is made as to whether all of the space of the next tier (a higher tier than a current tier of the extent of data) is allocated by weighted extents of data, e.g., see decision 778. In response to a determination that all of the space of the next tier is allocated by weighted extents of data, the request is rejected, e.g., see operation 776. In contrast, the heat of the extents are calculated according to updated heat weights, e.g., see operation 780. Based on at least the newly calculated heat(s), a response is sent to the controller, e.g., see operation 782, and data migration starts according to the new heat, e.g., see 784.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), the CIM comprising:
obtaining application data associated with interaction of applications of host servers that use a data storage system;
using the application data to predict performance requirements for the applications with respect to the data storage system;
maintaining a persistent control repository that includes parameter fields, wherein a first and second of the parameter fields detail, for extents of data stored in tiers of the data storage system and used by the applications, associated ranges of acceptable performance targets, wherein a third and fourth of the parameter fields detail, associated arrival times for requests from the applications for the extents of data,
wherein a first of the requests is a performance upgrade request for a first of the extents of data, wherein the range of acceptable performance targets associated with the first request is defined by an accepted performance target of the first extent of data and a maximum performance target of the other application requests;
using the persistent control repository to calculate heat weights for the extents of data; and
causing a tiering manager of the data storage system to adjust a current tiering of at least some of the extents of data in the tiers based on the calculated heat weights.

2. The CIM of claim 1, wherein maintaining the persistent control repository includes:
in response to receiving the first request, determining whether a first value that is based on an average performance of the data storage system using the first extent of data meets a performance target of the first request; and
in response to a first determination that the first value meets the performance target of the first request: unsetting a first flag, and updating at least some of the parameter fields of the persistent control repository,
wherein the tiering manager is configured to adjust the current tiering of at least some of the extents of data in response to the first flag being set.

3. The CIM of claim 2, wherein the third parameter field defines arrival times of previous requests for the extents of data, wherein the fourth parameter field defines an arrival time of a rival request having a maximum relative performance target, wherein updating at least some of the parameter fields of the persistent control repository in response to the first determination includes:
setting the arrival time of the rival request having the maximum relative performance target for the first extent of data to the arrival time of the previous request for the first extent of data;
setting the maximum performance target of the other application requests to the accepted performance target of the first extent of data;
setting the arrival time of the previous request for the first extent of data to an arrival time of the first request; and
setting the accepted performance target of the first extent of data to the performance target of the first request.

4. The CIM of claim 3, wherein maintaining the persistent control repository includes: in response to a second determination that the first value does not meet the performance target of the first request: setting the first flag, and updating at least some of the parameter fields of the persistent control repository.

5. The CIM of claim 3, wherein a fifth of the parameter fields details missing request interval thresholds for the extents of data, wherein the missing request interval thresholds define a number of times that associated request interval thresholds can be exceeded for the extents of data, wherein the associated request interval thresholds define when requests for heartbeats are to be sent by the host servers.

6. The CIM of claim 5, wherein maintaining the persistent control repository includes: in response to a determination that the arrival time of the first request is greater than the missing request interval threshold for the first extent of data, removing all data in the persistent control repository associated with the first extent of data, and setting the heat weight for the first extent of data to a null value.

7. The CIM of claim 1, wherein the heat weights for the extents of data are calculated using a formula based on the host server's use of the data storage system.

8. The CIM of claim 1, wherein the application data is selected from the group consisting of: priority information, historical statistics, interaction of components of the host servers and user feedback.

9. A computer program product (CPP), the CPP comprising:
a set of one or more computer-readable storage media; and
program instructions, collectively stored in the set of one or more storage media, for causing a processor set to perform the following computer operations:
obtain application data associated with interaction of applications of host servers that use a data storage system;
use the application data to predict performance requirements for the applications with respect to the data storage system;
maintain a persistent control repository that includes parameter fields, wherein a first and second of the parameter fields detail, for extents of data stored in tiers of the data storage system and used by the applications, associated ranges of acceptable performance targets, wherein a third and fourth of the parameter fields detail, associated arrival times for requests from the applications for the extents of data,
wherein a first of the requests is a performance upgrade request for a first of the extents of data, wherein the range of acceptable performance targets associated with the first request is defined by an accepted performance target of the first extent of data and a maximum performance target of the other application requests;
use the persistent control repository to calculate heat weights for the extents of data; and
cause a tiering manager of the data storage system to adjust a current tiering of at least some of the extents of data in the tiers based on the calculated heat weights.

10. The CPP of claim 9, wherein maintaining the persistent control repository includes:
in response to receiving the first request, determining whether a first value that is based on an average performance of the data storage system using the first extent of data meets a performance target of the first request; and
in response to a first determination that the first value meets the performance target of the first request: unsetting a first flag, and updating at least some of the parameter fields of the persistent control repository, wherein the tiering manager is configured to adjust the current tiering of at least some of the extents of data in response to the first flag being set.

11. The CPP of claim 10, wherein the third parameter field defines arrival times of previous requests for the extents of data, wherein the fourth parameter field defines an arrival time of a rival request having a maximum relative performance target, wherein updating at least some of the parameter fields of the persistent control repository in response to the first determination includes:
   setting the arrival time of the rival request having the maximum relative performance target for the first extent of data to the arrival time of the previous request for the first extent of data;
   setting the maximum performance target of the other application requests to the accepted performance target of the first extent of data;
   setting the arrival time of the previous request for the first extent of data to an arrival time of the first request; and
   setting the accepted performance target of the first extent of data to the performance target of the first request.

12. The CPP of claim 11, wherein maintaining the persistent control repository includes: in response to a second determination that the first value does not meet the performance target of the first request: setting the first flag, and updating at least some of the parameter fields of the persistent control repository.

13. The CPP of claim 11, wherein a fifth of the parameter fields details missing request interval thresholds for the extents of data, wherein the missing request interval thresholds define a number of times that associated request interval thresholds can be exceeded for the extents of data, wherein the associated request interval thresholds define when requests for heartbeats are to be sent by the host servers.

14. The CPP of claim 13, wherein maintaining the persistent control repository includes: in response to a determination that the arrival time of the first request is greater than the missing request interval threshold for the first extent of data, removing all data in the persistent control repository associated with the first extent of data, and setting the heat weight for the first extent of data to a null value.

15. The CPP of claim 9, wherein the heat weights for the extents of data are calculated using a formula based on the host server's use of the data storage system.

16. The CPP of claim 9, wherein the application data is selected from the group consisting of: priority information, historical statistics, interaction of components of the host servers and user feedback.

17. A computer system (CS), the CS comprising:
   a processor set;
   a set of one or more computer-readable storage media; and
   program instructions, collectively stored in the set of one or more storage media, for causing the processor set to perform the following computer operations:
   obtain application data associated with interaction of applications of host servers that use a data storage system;
   use the application data to predict performance requirements for the applications with respect to the data storage system;
   maintain a persistent control repository that includes parameter fields, wherein a first and second of the parameter fields detail, for extents of data stored in tiers of the data storage system and used by the applications, associated ranges of acceptable performance targets, wherein a third and fourth of the parameter fields detail, associated arrival times for requests from the applications for the extents of data,
   wherein a first of the requests is a performance upgrade request for a first of the extents of data,
   wherein the range of acceptable performance targets associated with the first request is defined by an accepted performance target of the first extent of data and a maximum performance target of the other application requests,
   wherein maintaining the persistent control repository includes:
      in response to receiving the first request, determining whether a first value that is based on an average performance of the data storage system using the first extent of data meets a performance target of the first request; and
      in response to a first determination that the first value meets the performance target of the first request: unsetting a first flag, and updating at least some of the parameter fields of the persistent control repository;
   use the persistent control repository to calculate heat weights for the extents of data; and
   cause a tiering manager of the data storage system to adjust a current tiering of at least some of the extents of data in the tiers based on the calculated heat weights,
   wherein the tiering manager is configured to adjust the current tiering of at least some of the extents of data in response to the first flag being set.

18. The CS of claim 17, wherein the third parameter field defines arrival times of previous requests for the extents of data, wherein the fourth parameter field defines an arrival time of a rival request having a maximum relative performance target, wherein updating at least some of the parameter fields of the persistent control repository in response to the first determination includes:
   setting the arrival time of the rival request having the maximum relative performance target for the first extent of data to the arrival time of the previous request for the first extent of data;
   setting the maximum performance target of the other application requests to the accepted performance target of the first extent of data;
   setting the arrival time of the previous request for the first extent of data to an arrival time of the first request; and
   setting the accepted performance target of the first extent of data to the performance target of the first request.

19. The CS of claim 18, wherein maintaining the persistent control repository includes: in response to a second determination that the first value does not meet the performance target of the first request: setting the first flag, and updating at least some of the parameter fields of the persistent control repository.

* * * * *